United States Patent
Plenderleith

(10) Patent No.: US 11,461,322 B1
(45) Date of Patent: Oct. 4, 2022

(54) TRANSPARENT DATABASE TABLE PARTITIONING USING PROXY-BASED QUERY REWRITING

(71) Applicant: Amazon Technologies, Inc., Seattle, WA (US)

(72) Inventor: Jamie Plenderleith, Dublin (IE)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/829,332

(22) Filed: Mar. 25, 2020

(51) Int. Cl.
G06F 16/2453 (2019.01)
G06Q 10/06 (2012.01)

(52) U.S. Cl.
CPC . G06F 16/24537 (2019.01); G06Q 10/06315 (2013.01)

(58) Field of Classification Search
CPC .... G06F 16/24537; G06F 9/50; G06F 9/5077; G06Q 10/06315
See application file for complete search history.

(56) References Cited

U.S. PATENT DOCUMENTS

| | | |
|---|---|---|
| 10,061,852 B1 | 8/2018 | Plenderleith |
| 2004/0181523 A1* | 9/2004 | Jardin ................. G06F 16/2456 |
| 2019/0288915 A1* | 9/2019 | Denyer .................... G06F 9/54 |
| 2020/0210325 A1* | 7/2020 | Allweil ............... G06F 11/3688 |

* cited by examiner

Primary Examiner — William B Partridge
Assistant Examiner — Aryan D Toughiry
(74) Attorney, Agent, or Firm — NDWE LLP

(57) ABSTRACT

Techniques for transparent database table partitioning using proxy-based query rewriting are described. Multiple tables of a single database can be split up and hosted by multiple database instances. A database proxy receives database statements to be executed by the database and can send the statement to the corresponding database instance. For statements referencing multiple tables that are not co-hosted by a same database instance, the proxy rewrites the statements to generate multiple different statements to be sent to individual database instances hosting the referenced tables, and generates a final result based on responses from the database instances.

20 Claims, 10 Drawing Sheets

DATABASE INSTANCE 122B

| CUSTOMERID | NAME  | AGE | ADDRESS         | EXTENSION |
|------------|-------|-----|-----------------|-----------|
| 1          | BOB   | 33  | 123 FIRST ST.   | 1234      |
| 2          | ROHIT | 37  | 2244 JAMES AVE. | 2224      |
| 3          | JAMIE | 20  | 15220 PENDLETON | 4567      |

CUSTOMERS TABLE 305

| ORDERID | CUSTOMERID | ORDERAMOUNT |
|---------|------------|-------------|
| C12351  | 3          | 50000       |
| F25713  | 3          | 12000       |
| C31318  | 3          | 5000        |
| C24214  | 1          | 3700        |
| C15779  | 2          | 1100        |

ORDERS TABLE 310

DATABASE INSTANCE 122C

```
SELECT
      C.NAME, C.ADDRESS, SUM(O.ORDERAMOUNT) AS SUMORDERS
FROM
      CUSTOMERS C
INNER JOIN
      ORDERS O ON C.CUSTOMERID = O.CUSTOMERID
GROUP BY
      C.CUSTOMERID, C.NAME, C.ADDRESS
HAVING
      SUM(O.ORDERAMOUNT) > 2500
```

EXAMPLE DATABASE STATEMENT 315

| NAME  | ADDRESS         | SUMORDERS |
|-------|-----------------|-----------|
| JAMIE | 15220 PENDLETON | 67000     |
| BOB   | 123 FIRST ST.   | 3700      |

EXAMPLE DATABASE RESULT 320

*FIG. 3*

```
SELECT
      C.NAME, C.ADDRESS, SUM(O.ORDERAMOUNT) AS SUMORDERS
FROM
      CUSTOMERS C
INNER JOIN
      ORDERS O ON C.CUSTOMERID = O.CUSTOMERID
GROUP BY
      C.CUSTOMERID, C.NAME, C.ADDRESS
HAVING
      SUM(O.ORDERAMOUNT) > 2500
```

EXAMPLE DATABASE STATEMENT 315

```
SELECT
      CUSTOMERID, SUM(ORDERAMOUNT) AS SUMORDERS
FROM
      ORDERS
GROUP BY
      CUSTOMERID
HAVING
      SUM(ORDERAMOUNT)>2500
```

FIRST CUSTOM STATEMENT 405

| CUSTOMERID | SUMORDERS |
|---|---|
| 3 | 67000 |
| 1 | 3700 |

FIRST RESULT 410

SECOND CUSTOM STATEMENT 415 (BASED ON RESULT 410)

```
SELECT
      CUSTOMERID, NAME, ADDRESS
FROM
      CUSTOMERS
WHERE
      CUSTOMERID IN (3,1)
```

| CUSTOMERID | NAME | ADDRESS |
|---|---|---|
| 3 | JAMIE | 15220 PENDLETON |
| 1 | BOB | 123 FIRST ST. |

SECOND RESULT 420

| NAME | ADDRESS | SUMORDERS |
|---|---|---|
| JAMIE | 15220 PENDLETON | 67000 |
| BOB | 123 FIRST ST. | 3700 |

EXAMPLE DATABASE RESULT 320

TRANSPARENT DATABASE TABLE PARTITIONING USING PROXY-BASED QUERY REWRITING

BACKGROUND

Developing modern software applications that use databases to not only scale readily but also effectively is extremely complicated. Such efforts require a careful matching of application demands—which often change over time—with the available database capacity to maintain predictable performance at a reasonable cost and complexity. For example, a trading platform application may swiftly scale up in reaction to market events and create a surge of database connections. Similarly, an e-commerce application may keep database connections open and idling to provide faster response to buyers when they engage. Complicating matters further is that queries may need to utilize amounts of data that may be significantly larger than the amount of memory available to the database, possibly rendering it impossible to perform database operations completely "in memory," leading to substantial performance degradation.

As a result, many developers over-provision database capacity to be able to handle peak (or even over-peak) expected utilization, which is extremely wasteful as many database resources will thus typically remain idle. This also increases complexity, management overhead, and overall cost. However, even with such over-provisioning, applications and databases can still get overwhelmed when unforeseen peaks are encountered, when the amount of data in the database increases in size, or when the usage patterns of the database change.

BRIEF DESCRIPTION OF DRAWINGS

Various embodiments in accordance with the present disclosure will be described with reference to the drawings, in which:

FIG. 3 is a diagram illustrating exemplary database tables, a database statement, and an anticipated result according to some embodiments.

FIG. 4 is a diagram illustrating query rewriting and database table partitioning for executing a database statement according to some embodiments.

DETAILED DESCRIPTION

Figure 1:
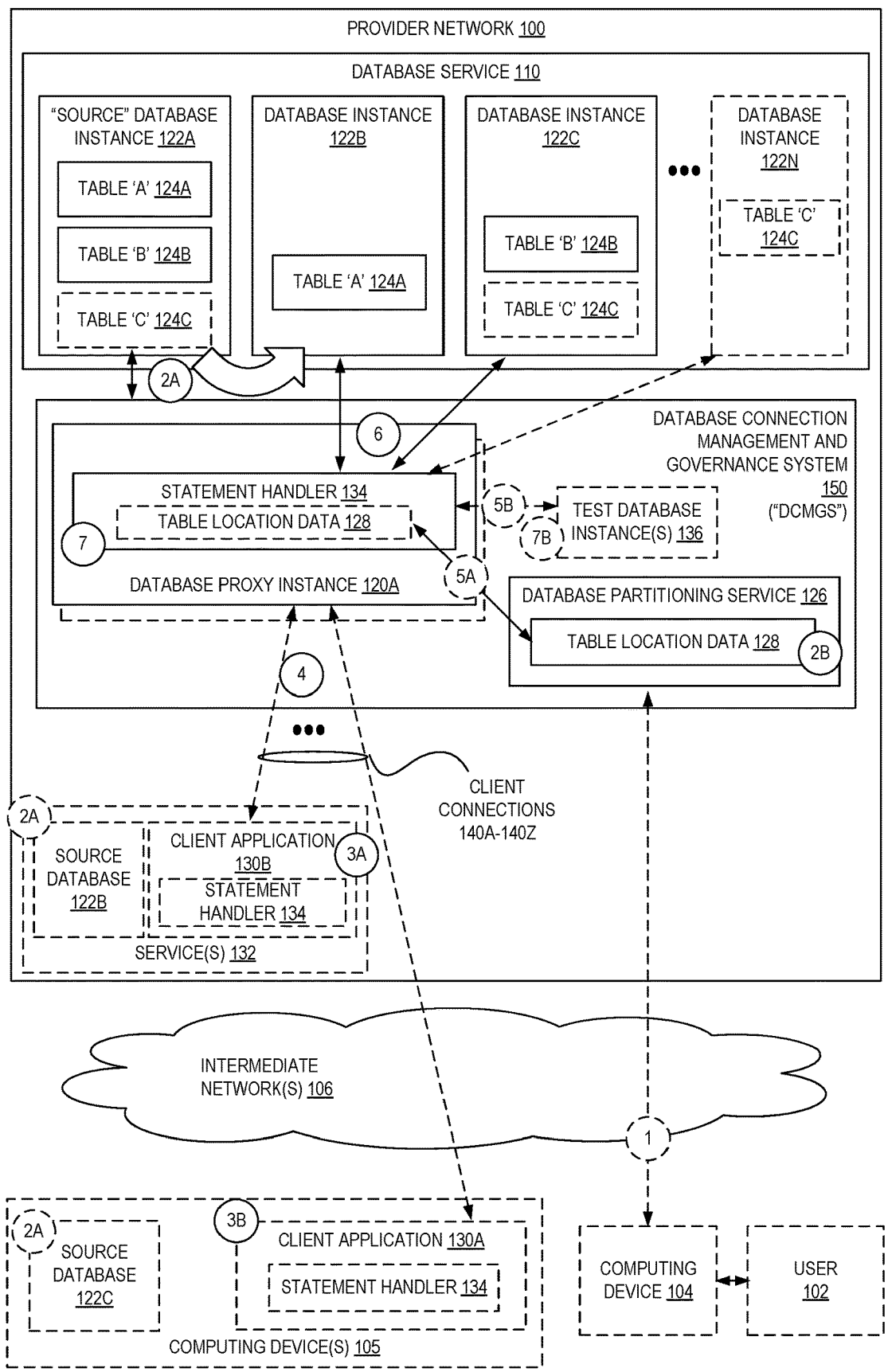
FIG. 1 is a diagram illustrating an environment for transparent database table partitioning using proxy-based query rewriting according to some embodiments.

The present disclosure relates to methods, apparatus, systems, and non-transitory computer-readable storage media for transparent database table partitioning using proxy-based query rewriting. According to some embodiments, different tables of a database and/or data from a single table of a database can be distributed across multiple database instances. A query handler implemented in a database proxy or in a client database driver can translate, as needed, statements to be executed against the database into one or more statements to be executed by potentially multiple database instances hosting the involved table or tables.

Traditionally, a given database will have a collection of tables inside of it. However, if those tables start to become too big or too busy, then the server operating that database will need to share its resources (e.g., time, memory, processing) amongst these multiple tables. For example, if two different tables of a database are being used such that they are causing a lot of input/output operations per second (IOPS), the common storage subsystem is shared between those two. Or, if two tables are sufficiently large and are frequently accessed by a lot of queries, the database server may not be able to keep enough of both tables in-memory to serve queries from cache, and thus require more IOPS to serve queries. Moreover, as database tables grow, they individually may reach the maximum size of the database supported by the database engine. For example, if a particular database cannot exceed one petabyte (PB), but in operation two tables begin to approach 0.5 PB in size each, the database may no longer continue being operational.

Accordingly, in some embodiments a database partitioning service may migrate a database running on a single server that has multiple tables to multiple databases on multiple servers with a single table per database or a proper subset of the tables per database. This migration may be performed on demand (e.g., per a request of a customer), as part of a migration system, and/or dynamically in response to an operating condition being detected (e.g., a database server instance operation condition being satisfied, such as a CPU or memory utilization threshold being reached), etc. As a result, by way of example, a database may be partitioned on a per-table basis (e.g., where a table may be implemented on a database server instance by itself), the resources of that server instance can be fully dedicated to that table. This can allow for entire tables of a database to remain in memory (that previously could not) to improve caching, allow for dedicated use of processing resources (e.g., cores or processors accessible by the server instance) to improve performance (e.g., for central processing unit (CPU) intensive tasks such as those needed for summations, aggregations, complex functions, etc.), etc. As used herein, the terms "partition" or "split," with reference to database tables, may generally be used to refer to the concept of hosting different database tables of a same database on multiple different database instances, and/or for the concept of storing different proper subsets of the data/records (of a table) on different database instances. Thus, these terms are used somewhat interchangeably and are to be understood as such unless otherwise made clear by the context of their use.

By way of example, a database server instance called "SERVER01" could host a database called "OrderData" that has multiple tables such as "Customers", "OrderLineItems", "Orders", "Products", etc. It may be the case that some or all of these tables are very large and individually (or in combination) exceed the memory capacity of the server instance, or, may get so large that the database engine might start preventing writes. According to some embodiments, these tables could be partitioned from the single database server instance across multiple database server instances, e.g., SERVER01's "OrderData" database may get migrated to: a "SERVER02" database server instance with a "OrderData.Customers" database that only has the Customers table in it, a "SERVER03" database server instance with a "OrderData.OrderLineItems" database which only has the OrderLineItems table in it, a "SERVER04" database server instance with a "OrderData.Orders" database that only has the Orders table in it, a "SERVER05" database server instance with a "OrderData.Products" database that only has a Products table in it, etc. In this configuration, the full computing resources (e.g., memory, processing, network, etc.) of each server (optionally along with read replica servers) can be effectively and efficiently used for individual tables.

In some embodiments, an application that utilizes ones of these tables can be insulated from the underlying data placement changes via use of a database proxy. The application may simply connect to the database proxy as if it were the database itself, and the proxy may intelligently send database statements to the necessary database server instance(s). For example, a database query involving a first table may be sent to a first database server instance hosting that table, while a database query involving a second table may be sent to a second database server instance hosting that second table. Moreover, in some embodiments, for database statements involving multiples tables, such as those utilizing "JOIN" clauses, the database proxy may intelligently interact with multiple database server instances to gather needed information from these tables and perform the combination of the data, e.g., on its own, via use of one of the database server instances, via use of a test database instance, or the like. Accordingly, in some embodiments an application's code beneficially does not need to be updated due to the movement of the tables from a single database to multiple databases; instead, the database proxy can simply accommodate the data movement on its own.

For further detail, FIG. 1 is a diagram illustrating an environment for transparent database table partitioning using proxy-based query rewriting according to some embodiments. As described herein, in various embodiments tables of a database can be separated and thus hosted by different database instances without necessarily needing to update calling application(s) to access this data from the different locations. Thus, in some embodiments this movement of tables (or table data such as rows) can be performed transparently. A change in a computing system, such as new feature or new component, is typically said to be transparent if the system after the change adheres to the previous external interface as much as possible despite changing its internal behavior. A transparent change shields the other systems (or human users) on the other end of the interface from needing to change to adapt to the new architecture. Thus, the term transparent may refer to the overall invisibility of the change of the component and does not refer to the visibility of component's internals (as in a white box or open system).

FIG. 1 illustrates a database partitioning service 126 that may operate as part of, or in collaboration with, a database connection management and governance system 150 (or "DCMGS") of a database service 110 that performs database connection management and governance via use of one or more database proxy instances 120A-120N. The database partitioning service 126, DCMGS 150, and database service 110 may be implemented as software, hardware, or a combination of both. In some embodiments, the implementation of these services may be within a multi-tenant provider network 100.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

Thus, a cloud provider network (or just "cloud") typically refers to a large pool of accessible virtualized computing resources (such as compute, storage, and networking resources, applications, and services). A cloud can provide users with convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network 106 (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Generally, many types of modern computing applications rely on databases, and in particular, relational databases. Computing applications 130A-130B, such as websites, mobile application backends, analytics software, and the like, may be implemented within a provider network 100 using one or more compute-type services 132 such as a hardware virtualization service or serverless code execution service, or in another location by one or more computing devices 105 (e.g., by applications executing in a data center, by applications executed by "client" devices such as personal computers, smart devices, mobile devices, etc.). At some point, these computing applications may use database functionality provided by one or more database instances 122A-122N of a database service 110 by sending messages carrying database statements (e.g., Structured Query Language (SQL) statements, such as SELECT queries, UPDATE or DELETE statements, etc.) to the database instance(s) 122A-122N, which can perform operations in response and optionally send back database results (e.g., status indicators, data stored by a database, data generated based on data stored by the database responsive to a query, etc.). In this manner, the computing applications act as a "client" application 130A-130B by requesting the database instance(s) 122A-122N to perform some operation(s) and thus act as a "server."

In some embodiments, a database instance 122A-122N is an isolated database environment running in the provider network 100, and may contains one or multiple user-created databases that can be accessed using the same client tools and applications that are used to access standalone database instances. Each database instance 122A-122N may have a database instance identifier, which can be a user-supplied name that uniquely identifies (e.g., within the entire provider network 100, or within a portion or region of the provider network 100) the database instance 122A-122N during interactions between the user and the database service 110 interfaces. A database instance 122A-122N may be implemented as a virtual machine, container, standalone application, or the like, and may execute directly on computing hardware or on top of another computing instance (e.g., VM).

Each database instance 122A-122N may support a database engine. For example, the database service 110 may support a number of database engines, including but not limited to MySQL, MariaDB, PostgreSQL, Oracle, Microsoft SQL Server, Amazon Aurora, etc. In some embodiments, the database service 110 may support one or more NoSQL databases, one or more object database management systems, one or more object-relational database systems, one or more data warehouse systems, a "serverless" interactive query service, or the like. Interactions with the database instance(s) 122A-122N may be performed via use of database statements (e.g., queries, commands, or the like) that adhere to a defined standard or query language (as defined by a query language definition), such as one or more of the many dialects, extensions, and implementations of SQL, like Transact-SQL (T-SQL), Procedural Language/ SQL (PUSQL), PUpgSQL (Procedural Language/Postgr- eSQL), SQL-86, SQL-92, SQL:2016, etc. The database instance(s) 122A-122N may thus implement a variety of types of databases in a variety of types of configurations. For example, a first database instance 122A and a second database instance 122B may be a master-failover pair, a primary database and a read replica, completely different databases, etc.

As shown in FIG. 1 an existing database (referred to herein as a "source" database instance 122) that includes multiple tables—e.g., table A 124A, table B 124B, table C 124C, etc. —may be deployed within a database service 110 of a provider network 100 as database instance 122A, run by another service 132 of the provider network 100 (such as a hardware virtualization service, etc.) as source database instance 122B, or even run outside the provider network 100 (e.g., in another provider network, in a customer's private network, in an "edge location" associated with the provider network 100, etc.) by another one or more computing device(s) 105 as source database instance 122C.

In some embodiments, one or more tables 124A-124C of the database instance 122 may be split into multiple database instances 122B-122N via the database partitioning service 126. The initiation of the split may occur according to various triggering events and may occur while the source database instance 122 remains in-use or when the source database instance 122 is not actively being used.

As a first example, as shown by the dashed (and thus optional) circle (1), a user 102 (e.g., an administrator or "owner" of the source database instance 122) using a computing device 104 (e.g., a personal computer (PC), laptop, smartphone, server computing device, etc.) may interact with the database partitioning service 126 to configure table splitting/partitioning. For example, the user 102 may be performing a database migration (e.g., via a non-illustrated database migration service of the provider network 100) to move a source database 122C that is outside of the provider network 100 into the database service 110, and as part of the workflow, may configure one or more of the tables to be split.

In some embodiments, the user 102 may provide an indication, to the database partitioning service 126 via one or more configuration messages transmitted by the computing device 104, of one or more tables that are to be deployed on their own to individual database instances. This may be used, for example, when a user knows that a particular table will likely grow in size significantly, is or will be used relatively heavily, etc., and thus providing the table its own database instance will improve the functioning of the overall database and thus, the application(s) using the database. Thus, the user 102 may select one or more tables, via a user interface, e.g., by selecting checkboxes associated with tables names to indicate ones of the tables that are to be deployed to independent database instances, and these table identifiers may be sent at circle (1) to the database partitioning service 126.

Figure 2:
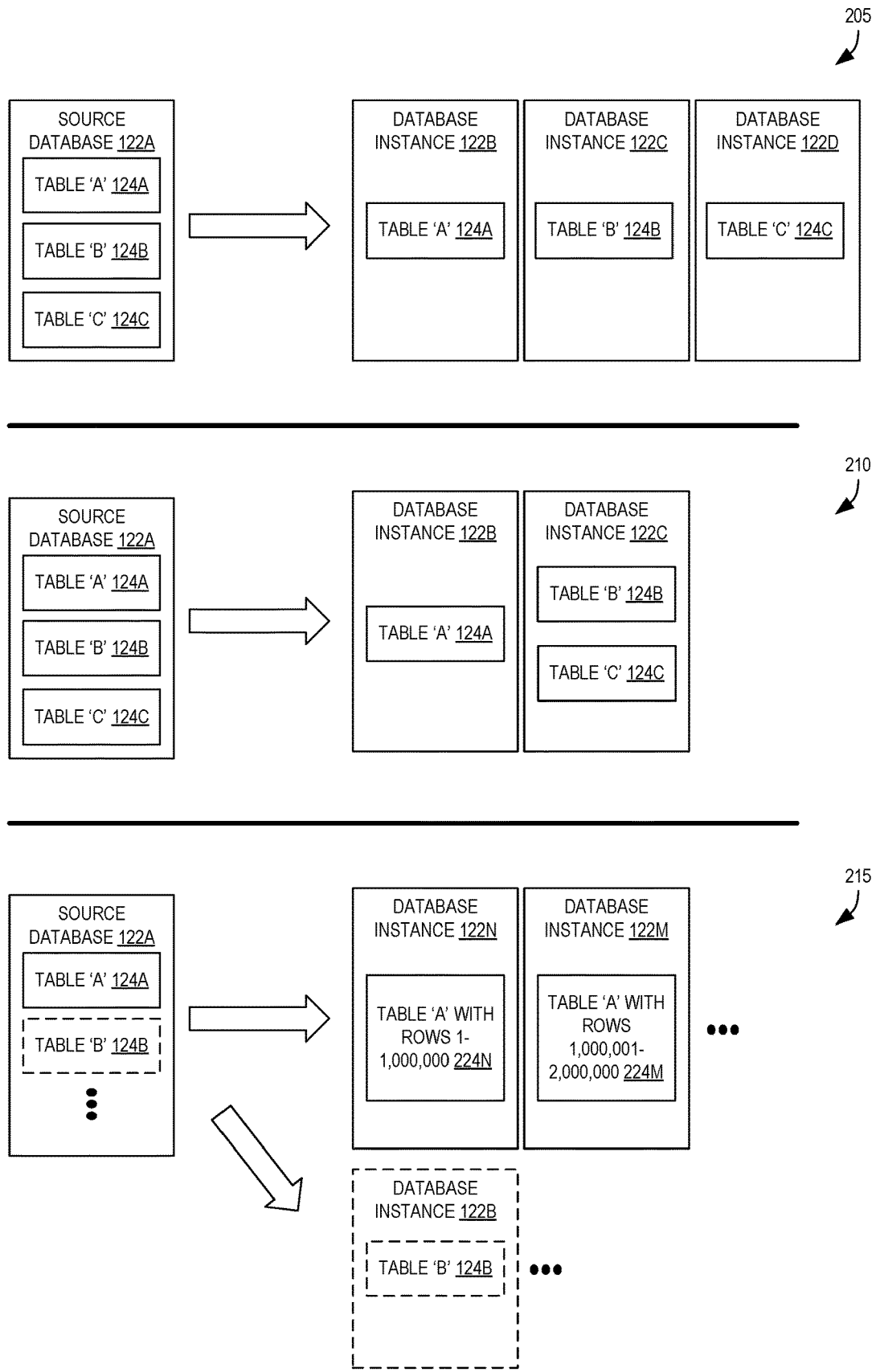
FIG. 2 is a diagram illustrating various database table partitioning techniques according to some embodiments.

Alternatively, or additionally, the database partitioning service 126 may analyze the source database instance 122 to identify any tables that may exist that could benefit from being split. For example, the database partitioning service 126 in some embodiments obtains descriptive metadata describing the database (e.g., as part of a database migration, via obtaining a schema, log data, etc.) and uses logic, such as a set of heuristics, machine learning techniques, etc., to identify tables to be split apart. For example, a first heuristic may indicate that a table of a particular threshold size (e.g., 5 gigabytes or more) or percentage of the database instance's memory (e.g., greater than 30% of its available random access memory (RAM)) should be independently deployed. As another example, a heuristic may indicate that a table experiencing a particular threshold growth rate (e.g., growing at a particular rate over a particular amount of time) should be split off. Thus, for example, a first table A 124A may be determined to be of a particular data threshold size (e.g., a number of rows, a data storage size in bytes, etc.) or threshold growth rate, and thus marked to be deployed to an independent database instance 122B. For example, FIG. 2 is a diagram illustrating various database table partitioning techniques according to some embodiments. In FIG. 2, at 205 a source database 122A with three tables has been designated to have each table be partitioned to independently be hosted by a separate database instance. In this case, each table thus enjoys the full suite of computing resources (e.g., memory, processing, network, storage, etc.) provided by its database instance, allowing for queries involving these tables to be processed more quickly.

In some embodiments, the heuristic rules may also attempt to keep tables deployed to a common database instance—optionally subject to other heuristic rules dictating otherwise—when these tables are observed to be utilized together (e.g., via SELECT queries) for a threshold amount of database statements. For example, the database partitioning service 126 may obtain database query logs and analyze these logs to identify that a pair of tables—e.g., table B 124B and table C 124C—are often used together in a query, e.g., these tables are joined via a JOIN clause in a threshold number of recently-observed queries. In such cases, the database partitioning service 126 may seek to deploy these two tables to a same database instance 122C. However, in some embodiments the database partitioning service 126 may not co-locate these tables when one (or any) other heuristic rules indicates that one of these tables is to be spit onto its own instance, though in some other embodiments a different set of heuristic rules may be applied to such table groups (e.g., two or more tables that are commonly-occurring in frequently-observed queries) to make it less likely that these tables would be split, e.g., a higher size or growth threshold of a co-occurring table is required to make it be deployed to its own database instance. Such a set of different heuristics can be used to keep these co-utilized tables together as long as possible to allow them to be commonly accessed by a same database engine for servicing database statements, which may be more efficient—to a point—than other embodiments, described herein, where a database proxy instance 120A may accommodate co-occurring tables that are hosted by different database instances. By way of example, at 210 in FIG. 2 a source database with three tables is shown to be partitioned to only two database instances—in this case, it may be that table B 124B and table C 124C were found to be used together in combination a threshold amount, or it may simply be that these tables (individually, or collectively) are "small" enough in some regard (e.g., size, usage frequency, etc.) such that they are best suited to be hosted together.

In some embodiments, the database partitioning service 126 may also be adapted to detect scenarios in which data of a single table might be best partitioned/split into multiple tables of multiple database instances. For example, a single table having three million records might be determined to better be hosted by three database instances, e.g., by placing records one through one million on a first database instance, records one million and one through two million on a second database instance, and records two million and one through three million on a third database instance, for example. As another example, as shown at 215 if FIG. 2, a table A 124A may be partitioned into at least two tables 224N-224M hosted by at least two database instances 122N-122M, respectively. Optionally, a different table B 124B (and others) may also be partitioned to other database instances, such as database instance 122B, or even co-reside on a database instance hosting some of table A's data (e.g., on database instance 122M).

Additionally, or alternatively, the database partitioning service 126 may partition data records (e.g., rows) of a table across different database instances based on the content of those records. For example, during the configuration of the database partitioning service 126 as reflected by circle (1) in FIG. 1, the user may specify logic for determining which records of a table are to be independently hosted. The logic may identify, for example, a particular column of a table as including values specifying how the rows are to be placed—e.g., rows with a value of "0" in a particular column are to be stored together, rows with a value of "1" in the column are to be stored together, and the like. The logic may additionally, or alternatively, provide one or more conditions that can be evaluated to determine where a record is to be stored, e.g., records are to be stored separately when they have both (a) a first column value greater than some threshold, and (b) a second column value within a defined set of values, as one example. Beneficially, various types of logic can be utilized that can be readily determined by one of skill in the art and flexibly selected to be implemented based upon the desires of the implementor, and thus these examples are to be viewed as illustrative.

Such configurations involving splitting up the records of a table can allow for database statements to potentially be executed more quickly, e.g., through each database instance being able to keep all of the records it hosts in memory. Thus, for example, a database query could be executed in parallel by multiple database instances and the result consolidated by a database proxy, as described later herein, much more quickly than if the query was provided to the previous single monolithic database instance that would need to likely repeatedly access slow, non-volatile storage such as a magnetic disk or solid state drive (SSD) or be bound by limited processing functionality (e.g., cores) to perform more complex operations (e.g., encryption, aggregation, or the like). Similarly, a database query may in some embodiments be intelligently provided to only a single one of these database instances hosting records of a table, which can process the query using the data in its memory, which is relatively much faster than if the query was provided to the previous single monolithic database instance. Additionally, certain data records could be stored independently from other data records of a same table, which could simply enable enhanced security for some potentially sensitive records (e.g., records stored at a first database instance are encrypted, governed by different access controls, or the like).

Accordingly, in some embodiments the database partitioning service 126 may identify a recommended database layout indicating information such as which—if any—tables should be hosted by their own database instance, which—if any—groups of tables should be hosted by a common database instance, which—if any—tables should be divided up and hosted by multiple database instances, and the like.

Moreover, in some embodiments the database partitioning service 126 may monitor the characteristics (e.g., table size, recent usage amounts, etc.) of the tables and/or database instances and may determine to "undo" the partitioning. For example, when the heuristics used to initiate a partitioning are no longer met, the database partitioning service 126 may decide to "undo" the partitioning by completely or partially moving the table data and/or tables back together onto common database instances.

Turning back to FIG. 1, in some embodiments, at circle (1) a user 102 may approve of the proposal, and in some embodiments the user 102 may modify the proposal to change how the tables are to be split up. As one example, a user 102 may know that a particular table that the database partitioning service 126 proposes to be hosted along with another one or more tables will likely grow significantly in time. Instead of allowing for this co-hosting to occur for some period of time (and potentially "split off" onto its own instance at a later point in time), the user 102 may instead indicate that this table should be hosted on its own database instance immediately.

In some embodiments, the database partitioning service 126 may analyze the source database to determine its own table partitioning plan and, based on the desires of the user 102, simply proceed accordingly. This configuration can allow for "hands-free" operation in which the user 102 beneficially does not need to be concerned with the layout and may simply allow the database partitioning service 126 to proceed. Alternatively, or additionally, the database partitioning service 126 may allow the user 102 to simply provide an indication of the desired database layout, with or without also performing the analysis on its own.

Thereafter, the database partitioning service 126 may initiate the partitioning of the source database instance 122 tables 124A-124C onto multiple database instances 122B-122N at circle (2A). This may occur as part of a database migration process orchestrated by another database migration service, upon an API command issued by the computing device 104 of the user 102, etc.

In some embodiments where the partitioning is part of database migration, the database partitioning service 126 may provide a rough layout schema to another system (e.g., the database migration service) to indicate how the database is to be created, e.g., in terms of placing the table A 124A on a first database instance 122B, table B 124B on a second database instance 122C, and the like. The database migration service may then launch and configure the necessary database instances 122B-122N with the table data obtained for the source database instance.

In some embodiments, the partitioning may be performed while the source database instance 122 remains online and potentially in use. For example, the database partitioning service 126 might query the source database instance 122 for its data and use it to generate additional database statements to insert the data into the "new" database instances. This may be coupled with caching (e.g., via a database proxy instance 120A) a set of database statements executed against ones of these tables as this fetch-and-insert process is performed, e.g., destructive statements (e.g., statements including INSERT, UPDATE, DELETE, etc.) issued against a first table are cached and then replayed, in-order, when the table has been re-created in the new instance(s). Similarly, when the "new" table is successfully created and populated, in some embodiments database statements issued involving that table may immediately be redirected to that instance. Alternatively, the statements may continue to be serviced by the source database, but also duplicated and silently run against the "new" database instances to ensure that the data of the tables remains up to date until the source database is no longer used.

Upon the deployment and configuration of the database instances 122B-122N and the tables 124A-124C hosted thereupon, the database partitioning service 126 updates at circle (2B) a data structure with table location data 128 that indicates, for each table (or for individual records, or collections of records), where that table is located (or record(s) are located). For example, the table location data 128 may be a mapping data structure that associates an identifier of a particular table with an identifier of a database instance 122 (e.g., its network address, its unique identifier within the context of the database service 110, or the like). The database partitioning service 126 may also cause the launch and/or configuring of a database proxy instance 120A, for example, by optionally providing it with information such as an identifier of the particular database, customer, users, etc., that will need to access the partitioned database, and optionally providing some or all of the table location data 128.

Thereafter, client application(s) 130A-130B may be configured to access the database via the database proxy instance 120A at circle (3A), (3B). For example, the DCMGS 150 may return a network address (e.g., an IP address) of the database proxy instance 120A that the client application(s) 130A-130B can utilize to interact with the database. This may occur, for example, by updating a database connection string or other configuration data associated with the client application(s) 130A-130B, which will then issue database statements toward the database proxy instance 120A at circle (4) over client database connections 140A-140Z.

Upon receipt of a database statement, the database proxy instance 120A may verify the identity of the calling client via provided credentials. A statement handler 134 of the database proxy instance 120A may then determine that the database associated with the query is or may be partitioned, e.g., via consulting a cached or remote data store associated with the database, customer, table, etc., indicating this fact. The database proxy instance 120A may then optionally use (previously) cached table location data 128 or obtain table location data 128 from the database proxy instance 120A at circle (5A) to identify which database instances are to be contacted to service the data statement.

For example, the statement handler 134 may examine the database statement to identify which table or tables are referenced. Using this information, the statement handler 134 may use these table names as lookup keys into a cache of table location data to identify a network address associated with each table (or another other unique identifier, such as a hostname, that can be used by the provider network to route traffic to the database instance hosting the table). Alternatively, or when the cache does not yield a match for at least one table, the statement handler 134 may issue an API request to the database proxy instance 120A indicating a request to obtain one or more network addresses (or unique identifiers, etc.). The request may identify particular tables or may identify a particular customer or database. Moreover, the request may identify a particular row or record associated with a table (or a logical predicate allowing for records to be identified), which may be useful when records of a single table are partitioned across multiple database instances. In response, the database partitioning service 126 may provide mapping data including, for one or more tables, one or more corresponding network addresses (or unique identifiers) of the associated database instances.

With this location information, the statement handler 134 of the database proxy instance 120A may determine how to process the database statement. If only a single table is referenced in the statement, the statement handler 134 can identify the associated network address, and send the database statement at circle (6) to that network address to be processed by the database instance hosting that table, which thereafter can execute the statement, and return results to the database proxy instance 120A, which in turn can process the results if needed at circle (7) and send the results back to the client over a client connection 140.

However, in some embodiments the statement handler 134 may use provided configuration data (from the database partitioning service 126) indicating whether a single table is partitioned across multiple database instances. This configuration data may indicate how that data is partitioned—e.g., that a first specific set of records (e.g., rows one through one million, or all records having a particular value of a particular column, or records that match a particular logical predicate, etc.) of a table (e.g., table C 124C) are hosted at a first database instance while a second specific set of records are hosted at a second database instance, and the like. Accordingly, when the database statement references a table that split across multiple database instances, the statement handler 134 may determine which database instances are needed to execute the statement and send the statement to only those database instances. For example, a SELECT query statement seeking data from every row may be sent to all database instances, which may execute the query, and each return a different result set to the database proxy instance 120A, which then consolidates all three results into a single result to be sent back to the client. As another example, a SELECT query statement may include a clause (e.g., a WHERE clause) limiting the query to only records stored by one of the database instances, and thus the statement handler 134 may determine that the statement only involves one of the database instances, send the statement to only that instance, and obtain a result from the database instance that can be returned to the client.

In some embodiments involving single tables that are partitioned across multiple database instances and tables thereof, the database proxy instance 120A may be configured to enforce constraints of the table. For example, a unique index constraint may exist needing to be enforced, and absent further controls, having the data spread across multiple database instances could lead to an occurrence in which the constraint is violated. Other constraints may similarly exist, such as the size of an index, the size of a values in a column of a key, etc. In some embodiments, to address these issues the statement handler 134 may utilize a separate one or more test database instances 136 at circle (5B) to determine whether a database statement does or does not violate a constraint. Each test database instance may be associated with a particular table or be associated with a particular index of a particular table (and thus, multiple test database instances may exist for multiple indices of a same table).

For example, in some embodiments, upon partitioning tables of the database, the database partitioning service 126 may also configure a test database instance 136 with a limited version of the table, e.g., including data for those columns making up a primary key, or involved in some other constraint, but possibly dropping other data that is not involved (e.g., large blobs, objects, and the like, not pertaining to a constraint). In such cases, the statement handler 134 may execute any destructive statements (e.g., inserts, deletes, updates, etc.) against the associated test database instance 136 to determine whether a violation exists as a result. If so, the statement handler 134 may cause this result to be sent back to the client, and thus the statement is not wrongfully executed against the tables. If not, the statement handler 134 may continue on via use of the one or more needed database instances as described herein to generate a result.

In some embodiments, the statement handler 134 may identify database statements that explicitly involve two or more tables, e.g., via detecting the presence of a JOIN clause, a JOIN clause equivalent (e.g., linking two tables to form a union by equating a column from a first table with a column from a second table), a subquery (or "nested query") involving a different table (e.g., a SELECT query embedded within the WHERE or HAVING clause of another SQL query), a FROM clause specifying two or more tables, or the like.

As it may be the case that these two (or more) tables are no longer co-hosted by a same database instance, database statements involving multiple tables cannot simply be sent to a database instance for processing. In such cases, the statement handler 134 can analyze the database statement and determine a technique for processing the database statement.

In some embodiments, the statement handler 134 first determines whether the statement involves tables that are not co-located at a same database instance. For example, if the statement references two or more tables that are all hosted by a same instance, the statement handler 134 may simply pass the statement on to that database instance for normal processing. However, if two or more tables referenced by the statement are located (or, hosted) by different database instances, the statement handler 134 performs a different set of operations.

In some embodiments, the statement handler 134 may analyze the query to construct two (or more) modified queries that can be sent to the database instances hosting the involved tables to generate a correct result. In some embodiments, the statement handler 134 utilizes a client library provided by a developer/vendor of the associated database instance engine to parse and/or tokenize the database statement, for example, to identify the involved tables, which columns of the tables are involved, etc. The statement handler 134 may then associate various clauses of the statement with the tables, e.g., the portions of a WHERE clause, to determine what data needs to be retrieved from what table, and thus, what statements need to be sent to which database instances. In some embodiments, the statement handler 134 may construct one or more data-gathering queries, send these queries for processing, and construct a final query based on the results of these data-gathering queries—in some cases this result can be passed back to the client, and in some cases this result can be used by the statement handler 134 to construct the ultimate result for the client.

For example, FIG. 3 is a diagram illustrating exemplary database tables 305/310, a database statement 315, and an anticipated result 320 according to some embodiments. In this example, a first table 305 stores customer information with unique key of "customerID" and a second table 310 stores order information with a primary key of "orderID" but a foreign key of "customerID" that links individual order records back to associated customer records of the customers table 305.

One possible database statement 315 that could be executed against these two tables is a SELECT query that attempts to obtain a result 320 of a name and address (from the customers table 305) as well as a summation of total order amounts (from the orders table 310) for those customers having a total summed order amount that is greater than the value 2500. However, in this example the tables 305/310 (of a same conceptual database) are partitioned among two different database instances 122B/122C, which could be executed by the same or different server computing devices, at a same or different server rack location, data center, building, or geographic area. Simply sending this example database statement 315 to each database instance 122B-122C would not work, as each database instance does not have the necessary tables to execute the query.

One way of addressing this would be to cause the application developer to update their queries to eliminate such multi-table statements by, for example, repeatedly issuing different single-table queries based on results of earlier single-table queries. However, this is extremely burdensome on the developer, incredibly non-performant (due to increased numbers of database calls, needing to wait for results, the need for additional application logic), and perhaps most importantly breaks existing applications.

Instead, in some embodiments the statement handler 134 can avoid needing to change the application in these ways through performing intelligent query processing on its own. FIG. 4 is a diagram illustrating query rewriting and database table partitioning for executing a database statement according to some embodiments. Upon receipt of database statement 315, the statement handler 134 may determine that the database statement 315 can be broken into a series of queries that can be run independently by generating and sending a first custom statement 405 to a first one of the tables, obtaining a first result 410, and using that data to generate a second custom statement 415 to be issued to the second one of the tables, to obtain another result 420 that can be used to generate the eventual result 320.

In this example, the statement handler 134 can analyze the database statement 315 to determine that the needed "sumorders" values can be obtained from the orders table along with corresponding "customerID" values that can be used to obtain the other information needed (e.g., name, address). Thus, the first custom statement 405 can be generated to obtain the first result 410, and the "customerID" values from this result can be used to generate a second custom statement 415 (e.g., in a WHERE clause) to obtain the name and address information associated with the customerIDs in a second result 420. Thus, based on the first result 410 and the second result 420, the statement handler 134 can straightforwardly construct the desired database result 320, e.g., by combining the sumorders values from the first result 410 with the corresponding name and address values from the second result 420.

In some embodiments, the statement handler 134 may keep one or both of these intermediate results 410/410 in its memory or in another local cache and reconstruct the final result on its own when all necessary data is available.

Additionally, or alternatively, in some embodiments the statement handler 134 may utilize the test database instance 136 to cache this data and/or to generate the final result 320. Likewise, additionally, or alternatively, in some embodiments the statement handler 134 can embed all necessary information (e.g., some of the first result 410 data) into a custom statement (e.g., custom statement 415) that causes one of the individual database instances itself to generate the complete database result 320. In this manner, the statement handler 134 may be more general (e.g., simple and more "lightweight") and instead rely on existing database engine logic to perform the statement processing, which potentially could be quite sophisticated (e.g., requiring complex functions such as statistical functions, encryption, complex comparisons, soundex code generation, etc.).

In some embodiments, the statement handler 134 can also perform "batch-like" processing of database statements and return back results to clients more quickly. For example, in some scenarios a client may issue a single database statement execution request that includes multiple database statements therein, e.g., a first SELECT query, a second SELECT query, etc., each separated by a semicolon. Traditionally, a final result is sent back to a client by the database when all statements have executed. The statement handler 134 may follow this behavior, though the statement handler 134 can also send ones of these statements out for processing at a same time or at different times to one or multiple different database instances, and may optionally return the results to the client individually (e.g., in-order, or out-of-order via use of an indication of what statement the result "belongs" to).

In some embodiments, the types of database instances and/or types of database engines utilized may be heterogeneous. For example, the database partitioning service 126 may cause a "larger" database instance (having larger memory, processing capabilities, storage, network capabilities, etc.) to be deployed to host a relatively large table, while a "smaller" database instance may be deployed for smaller tables. Additionally, or alternatively, the database partitioning service 126 may cause different database engines to be selected to host different tables, e.g., via knowledge that one database engine may perform certain types of operations on certain types of data values faster than another database engine. Such a selection may be made based on analyzing the database tables themselves (e.g., detecting a type of value, an amount of data, etc.) and/or analyzing previous statements involving those tables (e.g., detecting a threshold amount of queries involving a particular type of operation). This customization can beneficially speed up the performance of the partitioned database without affecting the clients, reduce operational costs, etc.

In some embodiments, the database partitioning service 126 need not rely on the database proxy instance(s) 120 to allow clients to utilize the partitioned database tables. For example, in some embodiments the client applications may be architected to send requests (e.g., API requests) to the database partitioning service 126 to seek identifiers (e.g., unique identifiers, hostnames, network addresses) corresponding to database instances where a particular table or record exists. Thus, a client application may provide in such a request an identifier of a table, an identifier of a particular row or set of rows, a set of logical statements (e.g., similar to query predicates) that can be evaluated to identify records, etc., to the database partitioning service 126, which may determine the location of the tables/database instances, and return the identifier(s). With this information, the client application 130 can thus "directly" attempt to send database statements to these locations. In some embodiments, such functionality can be made available via a statement handler 134 type plugin or library accessible to (or embedded within) the client application, which can perform similar operations as those described regarding the proxy-embedded statement handler 134.

Figure 5:
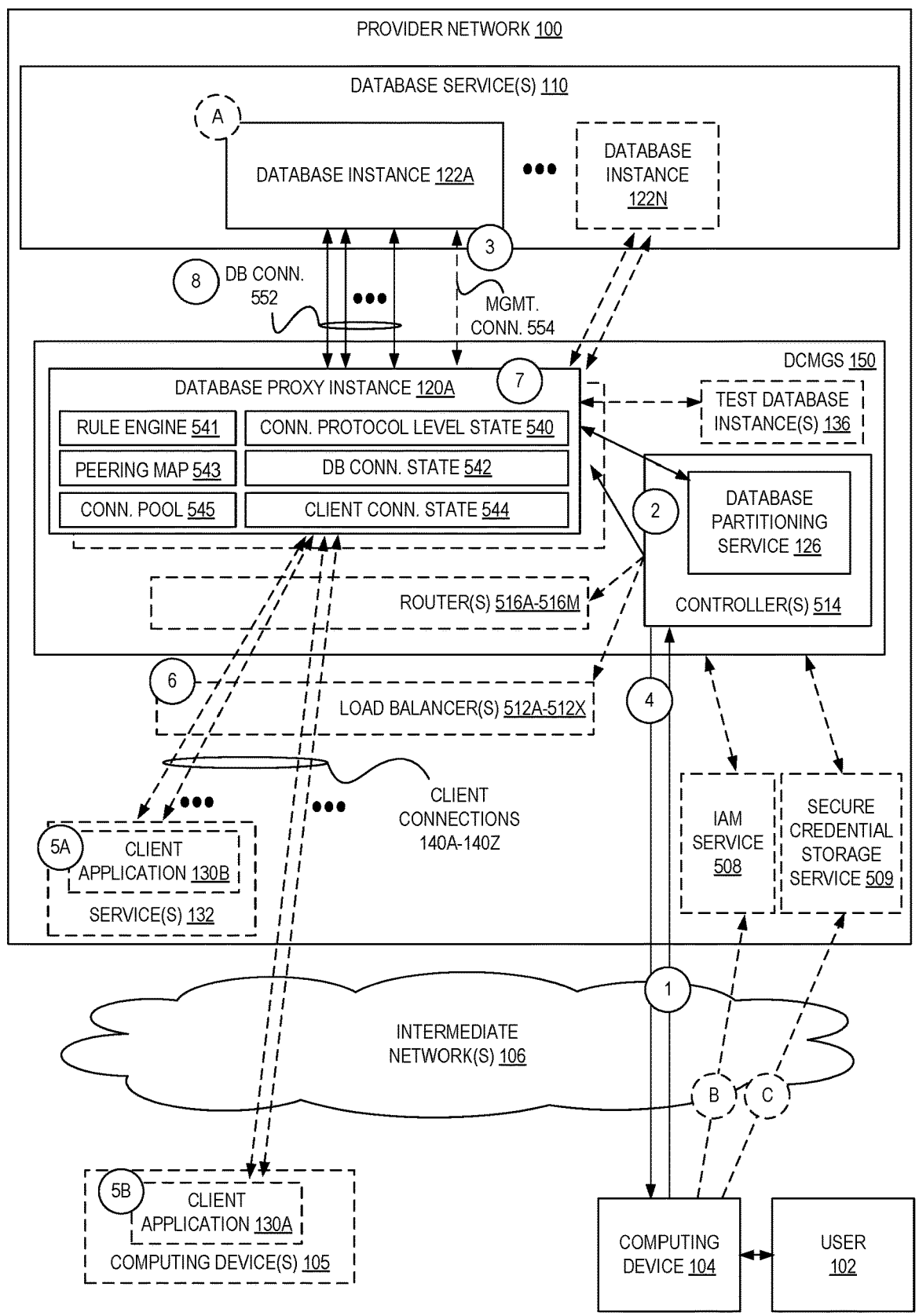
FIG. 5 is a diagram illustrating an environment including database proxy instances that can be used for transparent database table partitioning via proxy-based query rewriting according to some embodiments.

However, in some embodiments, the database partitioning service 126 relies on the use of database proxy instances 120 to manage client access to the database instances. FIG. 5 is a diagram illustrating an environment including database proxy instances that can be used for transparent database table partitioning via proxy-based query rewriting according to some embodiments. As indicated above, many types of modern applications 130A-130B reliant on databases may need to overprovision and manage database resources for a variety of reasons. The DCMGS 150 can eliminate such overprovisioning and active management typically required.

For example, many applications have unpredictable workloads. Applications that support highly variable workloads may attempt to open a burst of new database connections to support surges. The DCMGS's 150 connection governance functionalities can allow users to gracefully scale applications dealing with unpredictable workloads by efficiently using database connections. The DCMGS 150 can reutilize established database connections to serve queries or transactions from multiple application requests. Thus, users can support more application connections over fewer database connections, providing the efficient use of database resources. The DCMGS 150 can allow users to maintain predictable database performance by regulating the number of database connections that are opened. In some embodiments, the DCMGS 150 can shed unserviceable application requests to preserve the overall performance and availability of the application.

As another example, some applications frequently open database connections. Applications built on technologies such as serverless, PHP, or Ruby on Rails may frequently open new database connections on application requests. The DCMGS 150 can allow customers to maintain a pool of database connections to avoid the inefficiencies of establishing new connections with each new request.

Moreover, many applications keep database connections open but idle (or unused). Applications in industries such as SaaS or eCommerce often keep database connections idling to minimize the response time when a customer reengages. Instead of overprovisioning databases to support mostly idling connections, users can configure the DCMGS 150 to maintain these idle connections while only establishing database connections as required to optimally serve active requests.

As yet another example, many applications require high availability through transient failures. In some embodiments, the DCMGS 150 can allow users to build resilient applications that can transparently tolerate transient failures without complex failure handling code. The DCMGS 150, in some embodiments, automatically routes traffic to a standby database instance very quickly while preserving many or all application connections.

Further, the DCMGS 150 may provide improved security and centralized credential management. The DCMGS 150 aids users in building secure applications by giving them a choice to enforce Identity and Access Management (IAM) based authentication (e.g., via an IAM service 508) for accessing databases, and can also enable users to centralize database credentials management through a secure credential storage service 509.

For example, a user 102 may utilize an application (e.g., a web-based console) or other functionality to launch one or more database instances 122A-122N (as reflected by circle (A)) within a database service 110, which may be relational databases, NoSQL instances, or other type of database. The user 102 may, for example, utilize a web-based console application to select a "launch DB instance" user interface input element and provide a number of configuration parameters, such as an identifier of a requested DB engine type and version, license model, instance type, storage type and amount, master user credentials, etc. Alternatively, the computing device of the user may issue an API call to the database service 110 with similar information, or the user may launch and/or configure database instances using other techniques known to those of skill in the art.

Optionally, as shown by circle (B), the user 102 may cause the computing device 104 to configure an IAM service 508 with role information allowing the DCMGS 150 to create resources on behalf of the user's account (e.g., one or more load balancers 512A-512X, one or more routers 516A-516M, one or more database proxy instance(s) 120A-120N, etc.), and/or to configure the IAM service 508 with execution role information associated with a client application 130A-130B.

As shown by circle (C), the user 102 may also optionally store a "secret" value (e.g., a username and/or password for accessing the database instance(s)) with a secure credential storage service 509 that can securely (e.g., via encryption, access controls, etc.) store and control access to these secret values.

The user 102 may then, via use of an application executed by the computing device 104, configure the DCMGS 150 to provide connection management and governance for the database instance(s) 122. As one example, the user 102 may utilize one or more user interfaces to provide configuration information via one or more messages (as shown at circle (1)) to a controller 514 (of potentially many controllers 514 that may be run in a distributed manner) of the DCMGS 150. The configuration information may include, among many types of data, one or more identifiers of the database instance(s) 122A-122N, a name for the proxy, an identifier of the type(s) of database engines implemented by the database instance(s) 122A-122N, whether backend database connections should be encrypted (e.g., using TLS), a set of tags, etc.

Upon receipt of these one or more requests, the controller 514 may initiate a workflow to configure database connection management and governance accordingly at circle (2). For example, in some embodiments the controller 514 creates resources in a provider network account that is associated with the user's account, such as an endpoint (e.g., an entity associated with a network address that can receive network traffic destined to that address) that will later be used by the client application(s) 130 to send database statements toward the database instance(s) 122. The workflow may also include provisioning one or more database proxy instances 120A-120N, which may include launching compute instances (e.g., virtual machines) with database proxy software configured as described herein, and/or configuring the database proxy instance(s) 120A-120N for the user (e.g., configuring a rule engine 541 with system and/or user-provided rules to control how each database proxy instance is to operate). In some embodiments, the controller 514 may launch at least two database proxy instances 120A-120N (e.g., in an active-active configuration), which may be specifically placed in different availability zones (e.g., isolated failure domains) of the provider network 100. Before and/or after the launch of each database instance(s) 122A-122N, the controller 514 may directly (or indirectly, such as via configuration initialization files or flags) configure the database instance(s) 122A-122N and/or the database proxy instance(s) 120A-120N according to configuration information provided by the user (e.g., at circle (1)).

Upon being launched and configured, in some embodiments each database proxy instance 120A-120N opens a management connection 554 at circle (3) to each of the database instances 122A-122N (as identified by the user 102 during the initial configuration), optionally using authentication/authorization information (e.g., credentials) provided by the user 102 as configuration information, provided by the IAM service 508, provided by the secure credential storage service 509, etc. The management connection 554 allows the database proxy instance(s) 120A-120N to ensure that the database instance(s) 122A-122N are running and responsive, that the database instance(s) 122A-122N can be successfully accessed via provided credentials, etc. The management connection 554 may also allow the database proxy instance(s) 120A-120N to detect a failure of a database instance 122A and cause additional database statements received during this downtime to be instead passed to another database instance (e.g., a failover database instance), and/or may restore the use of the initial database instance if it comes back up. Thus, for client connections that were not actively using a backend database connection to a failed database instance, these clients may not be impacted by or even notice the failure whatsoever.

The controller 514, as part of the workflow, may also configure a load balancer 512, one or more routers 516A-516M, and the endpoint, so that the endpoint provides database statements (e.g., requests originated by clients that are destined to a database instance) to a database proxy instance (e.g., 120A), which may occur through the load balancer 512 to a router 516, which may identify a database proxy instance 120A, such as via an endpoint identifier of that where the database statement was received. The controller 514 may also configure a rule engine 541 of each database proxy instance 120 with rules to control how the database proxy instance 120A is to operate. The rules may be configured by the operator of the provider network 100 and/or by the user 102. For example, a user 102 may provide configuration data indicating if the user 102 wishes to pin certain client connections to certain database connections, and optionally an indication of how to determine which connections are to be so pinned (e.g., defining conditions of a client connections—such as the presence of a database statement that creates a prepared statement—that, when observed, are to cause the client connection to be pinned to a database connection). As another example, the user 102 may provide configuration data indicating if, when, and/or how to treat connections as being terminated (e.g., due to an amount of inactivity), whether connection multiplexing is to be enabled, whether pinning is to be enabled, what number of possible database connections may be utilized, whether (and/or how) to rewrite certain database statements, etc. During operation, each database proxy instance 120A may thus use this rule engine 541 and the associated rules to determine what operations to perform.

In some embodiments, the router(s) 516 and database proxy instance(s) 120A-120N may implement a heartbeat mechanism in which the database proxy instance(s) 120A-120N send a heartbeat message on a periodic or scheduled basis to one or more of the routers 516A-516M that indicates the continued availability of the database proxy instance(s) 120A-120N. In some embodiments, the heartbeat message includes a load value indicating a "load" currently (or recently) being placed on that proxy instance. For example, the load value may be a number of client connections 140A-140Z that the database proxy instance 120A is handling (or has the ability to handle), and/or an amount of processor utilization, memory utilization, network utilization, etc.

In some embodiments, the router 516A may select one of the database proxy instance(s) 120A-120N to be a recipient of a client connection based on this load value associated with each of the one or more database proxy instance(s) 120A-120N that are associated with the endpoint in which the database statement was received. For example, the router 516A may select a least loaded one of those matching database proxy instance(s) 120A-120N, e.g., having a smallest load value, though other routing mechanisms may be implemented. Such a mechanism can beneficially provide value when there are multiple routers 516 utilized, as a purely "local" decision made on the part of the router may be non-optimal due to the actions of other routers. For example, although one router may only send a small number of connections to a particular database proxy instance (and thus it may appear, locally, as being not busy), it may be the case that other routers have sent a huge number of connections to the proxy instance. As a result, the router can avoid making a poor decision based only on its local view, and instead can gain global visibility into the true load of the proxy due to the reported load value via the heartbeat messages.

The controller 514 may then, at circle (4), send an identifier of the endpoint (e.g., one or more of an IP address, hostname, port value, etc.) to the computing device 104 of the user 102, which the user 102 can use to configure the client application(s) 130A-130B at circle (5A) and/or circle (5B). For example, the user 102 may update a database connection string used by the client application 130 to connect to the database instance(s) via that endpoint identifier.

Thereafter, upon a client application 130 needing to access a database instance 122, the client application 130 may open a client connection 140A with a database proxy instance 120A at circle (6). This connection may be implemented by, for example, a client application 130B executed within a virtual network within the provider network 100 sending a request to an endpoint within the virtual network, which is thus routed to a load balancer 512, router 516, and/or database proxy instance 120A that may be outside the virtual network—in this manner, the database proxy 120A can be optionally "surfaced" within multiple different virtual networks within the provider network 100.

The database proxy instance 120A may use a role of, or an authentication token provided by, the calling application for authorization and/or authentication, e.g., by utilizing an IAM service 508 to determine whether the role is allowed access to the database instance (and thus the client application need not have direct access to database authentication credentials), to determine whether the authentication token is valid and is associated with privileges to access the database instance, etc. Additionally, or alternatively, the database proxy instance 120A may use a token provided by the client application (e.g., as part of opening the connection or with a database statement request) to retrieve a credential (e.g., a username and/or password) for accessing the database instance, or retrieve this token from the IAM service 508 and use it with the secure credential storage service 509 to obtain the credential, which may be passed on to the database instance 122A to authenticate the client. Additionally, or alternatively, the database proxy instance 120A may use a token comprising a username/password provided by the client application (e.g., as part of opening the connection or with a database statement request) to directly authenticate the client with the database instance.

The database proxy instance 120A may obtain a database connection 552 (between the proxy and the database instance) at circle (7) by opening a new database connection 552, identifying and thus selecting a database connection from a connection pool 545 of available open connections that matches the characteristics of the client connection, or update an existing connection from the pool 545 of open available connections to match an expected connection state for the client connection (e.g., by sending database statements/commands to the database instance to change a session state as described herein). In some embodiments, the database connection 552 may or may not be "pinned" to the client connection (i.e., dedicating it for that client's use) based on configured rules and/or thresholds, and further may be switched between being un-pinned (i.e., multiplexed) to pinned or between being pinned to un-pinned with similar rules and/or thresholds. When a particular client connection and database connection have been peered—either temporarily or when pinned—the database proxy instance 120A may update a peering map 543 data structure so that it can determine which connections are in use, which connections are peered, etc. In some embodiments, when a database connection that is in the pool 545 is selected and used, the database proxy instance 120A may thus remove that connection from the pool 545 (e.g., by removing an identifier of the connection, or updating a status flag associated with the connection, from the pool 545 structure) and/or update the peering map 543 to reflect the association of the connections.

In some embodiments, the database proxy instance 120A may track the database statement traffic to identify commands or actions made within the traffic that cause the session state of the connection be modified. The database proxy instance 120A may thus maintain a mapping, for each client connection (in a client connection state 544 store) and database connection (in a database connection state 542 store), of the current "state" of the connection.

It is known that for a database connection, a client application and/or the database instance itself may set or modify settings of the connection. For the life of this connection—or until these settings are further modified—both the database instance and the client implicitly assume this state to have been agreed upon. However, due to possible multiplexing of these database connections 552, a particular database connection 552 may be used by different clients having different expectations as to the state of the connection. Thus, the database proxy instance 120A may track the database statement traffic to identify the state of the connection, e.g., by watching for particular known statements that cause state changes. This state may thus be tracked, as indicated above, on a per client connection and database connection basis via state 542/544.

Thereafter, when a database statement is received on a client connection 140A, if the client connection is not "pinned" to a particular database connection, the database proxy instance 120A can identify an available open connection from the pool 545 of connections between the proxy instance and the database instance using the tracked state of the client connection (544) and comparing it to the state of ones of the database connections (542). It may be the case that an exact match is found, and thus that matching database connection 552 can directly be used to process that database statement. However, if no matching database connection is found via this state comparison process, the database proxy instance 120A can modify the state of an available database connection to match the client connection state, e.g., by replaying or issuing one or more database statements (e.g., to set an encoding value or time zone).

Various types of state may be tracked in various embodiments depending on the particular types of database protocols in use. For example, the state may include system variables that have been set on a per-connection basis, including but not limited to a time zone value, a session timeout, a connection mode (e.g., read/write), a particular mode of interpretation the database uses (e.g., ANSI mode, traditional mode), etc. As another example, the state may include connection properties, including but not limited to a character set, a user name, whether the connection uses encryption, etc. As another example, the state may include database properties such as the existence of a temporary table or prepared statement (e.g., a SQL template) that was created during the connection (that may need to be referenced later).

However, in some embodiments, if any (or particular types) of state changes are made, the database proxy instance(s) 120A-120N may alternatively "pin" the client connection with the associated database connection (thus eliminating multiplexing for that database connection until the client connection terminates), which may be conditioned on the proxy instance having sufficient other database connections that would remain available (per a configurable threshold) for multiplexing.

Having obtained a proper database connection 552, at circle (8) the database proxy instance 120A can forward the database statement received from the client application 130 to the database instance 122A, which can process the database statement and return any necessary response, which can be sent back to the client application 130.

As reflected herein, in some embodiments the proxy instance 120A may utilize multiple different database instances 122A-122N hosting multiple different tables to generate a result for the client application, and thus, multiple different database connections 552 to multiple different database instances may be utilized to send statements and receive results back.

In some embodiments, the database proxy instance 120A may also track the connection protocol level state 540 of each connection to determine whether the database instance has completed all processing for a particular database statement (e.g., query). Thus, the database proxy instance 120A may be state-aware in terms of the connection protocol itself and keep track of this state as connection protocol level state 540. Thus, the database proxy instance 120A can determine at which point it can "release" a database connection 552 into the pool as an available connection. For example, in the middle of a transaction (e.g., between when a query seeking data has been passed to the database instance and when all data has been returned) it is improper to release the connection, but when the database proxy instance 120A can verify that the transaction has completed it can release it. The database proxy instance 120A may need to track various subtle protocol scenarios to prevent early release, such as when a client sends a multi-statement query (wherein the database will return multiple sets of results), and thus the database proxy instance 120A may track how many sets of results are to be returned and thus may determine when the transaction is complete.

Figure 6:
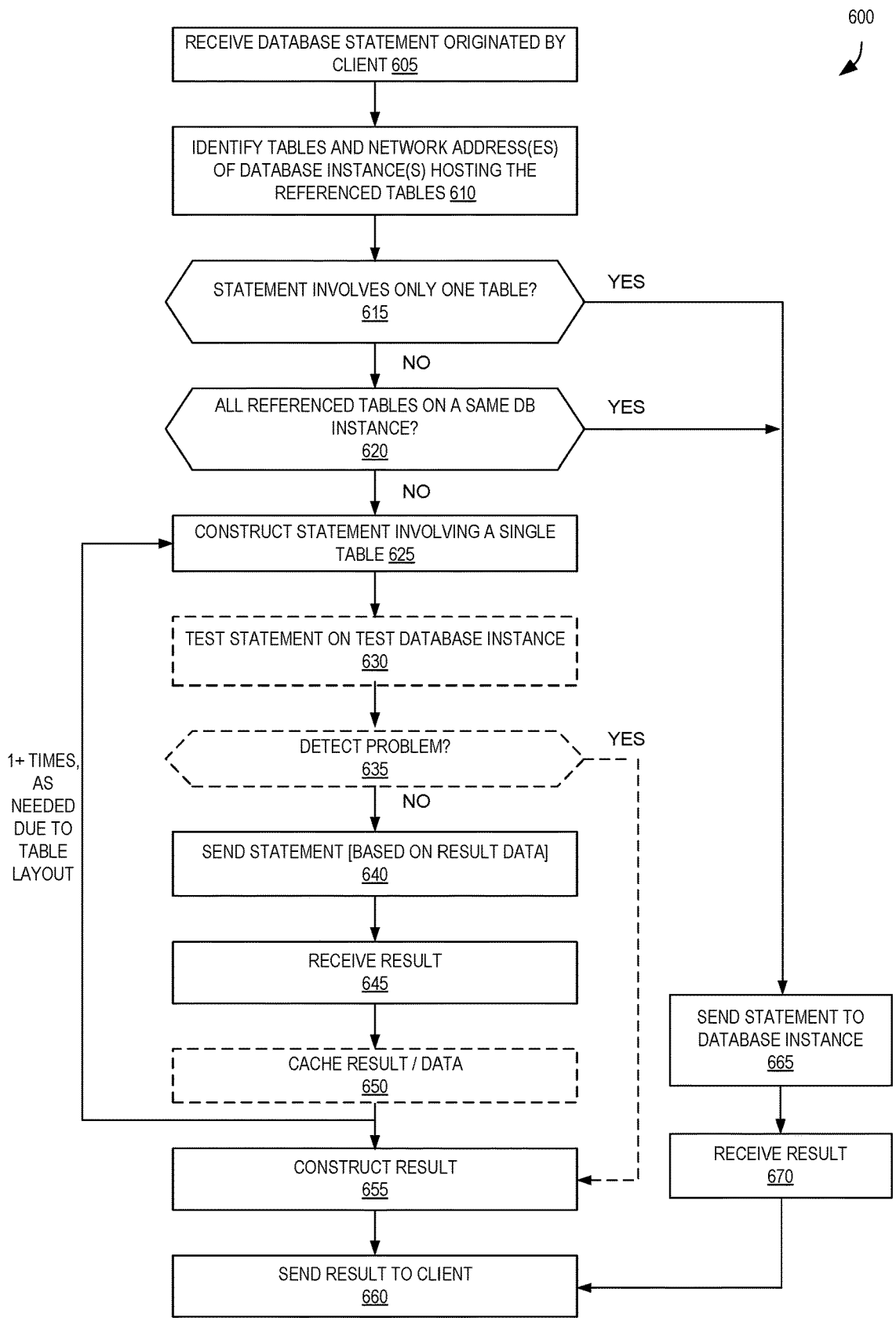
FIG. 6 is a flow diagram illustrating operations of a method for transparent database table partitioning using proxy-based query rewriting according to some embodiments.

FIG. 6 is a flow diagram illustrating operations 600 of a method for transparent database table partitioning using proxy-based query rewriting according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the database proxy instance 120 or DCMGS 150 of the other figures.

The operations 600 include, at block 605, receiving a database statement originated by a client application. The database statement may be adherent to a SQL dialect, and may be directed toward a relational database. The database may be partitioned across multiple database instances implemented within a provider network, where each database instance hosts a proper subset—that is, fewer than all—of the database's tables.

At block 610, the operations 600 include identifying one or more tables referenced in the database statement, and one or more network address(es) of database instance(s) hosting the one or more referenced tables. The database statement may be parsed to identify table names, which could be in FROM clauses, WHERE clauses, JOIN clauses, etc. Identifying the network address(es) of database instance(s) hosting the one or more referenced tables may include performing a lookup in one or more cache data structures that map table identifiers (e.g., made up of one or more of a table name, a customer identifier, a database identifier, etc.) to network addresses of database instances that host the tables. Identifying the network address(es) of database instance(s) may also include sending a request to a partitioning service to obtain all network addresses associated with a particular database, or sending a request to retrieve one or more network addresses associated with one or more specified (in the request) database tables, and then receiving a response from the partitioning service including the network addresses.

The operations 600 include, at decision block 615, determining whether the database statement references/involves only one table—if so, flow continues to block 665, where the received statement is sent on to the database instance associated with that table (e.g., using the corresponding network address) where it can be processed, and at block 670 a result is received and then sent back to the client at block 660.

If not, flow continues to decision block 620, which includes determining if all of the (multiple) referenced tables reside on a same database instance, which may include determining whether all network addresses associated with the tables are the same. If so, then flow may again continue to block 665, where the received statement is sent on to the database instance associated with that table (e.g., using the corresponding network address) where it can be processed, and at block 670 a result is received and then sent back to the client at block 660.

However, if the determination is that all referenced tables do not reside on a same database instance, flow continues to block 625, where a first statement can be generated (for a first database table of the multiple tables) based on the received statement to fetch some data useful in generating an ultimate result.

Optionally, at block 630, the operations 600 include testing the statement on a test database instance, which may include sending the statement to be executed, where the test database instance includes one or more tables corresponding to the database's one or more tables, but where these tables may have data values for a key but not the data values of one or more other columns (e.g., to save storage space). Block 630 may also include receiving some result from the test database instance, which may indicate that the statement was successfully executed or that the statement was not, and thus may indicate an error (e.g., a violation of a constraint on the table). If at optional block 635 a problem is detected (e.g., the existence of an error code in the result obtained back from the test database instance), the operations may continue to block 655 where a result is constructed (e.g., indicating an error), and then sent back to the client at block 660.

However, the operations 600 include, at block 640, sending the statement to the database instance hosting that table, receiving the result at block 645, and optionally caching the result (or data carried in the result) at block 650 in a non-volatile memory (e.g., hard disk, SSD) and/or volatile memory (e.g., RAM) and/or database (e.g., in a table of a test database instance).

The flow may then continue back to block 625 (one or more times), in which another statement may be generated for a second table (e.g., based on data returned from the first database instance as result 645), optionally tested at blocks 630-635, and sent for processing at block 640, where a result is obtained at block 645.

At some point, when all necessary data has been obtained, at block 655, the operations 600 include constructing a result. Block 655 may include using result data returned from one of the database instances (in its returned form, or by reformatting it), using result data returned from multiple ones of the database instances, etc. Block 655 may be performed by the proxy itself or may be performed by use of a test database instance. The result may then be sent back to the client application at block 660.

Figure 7:
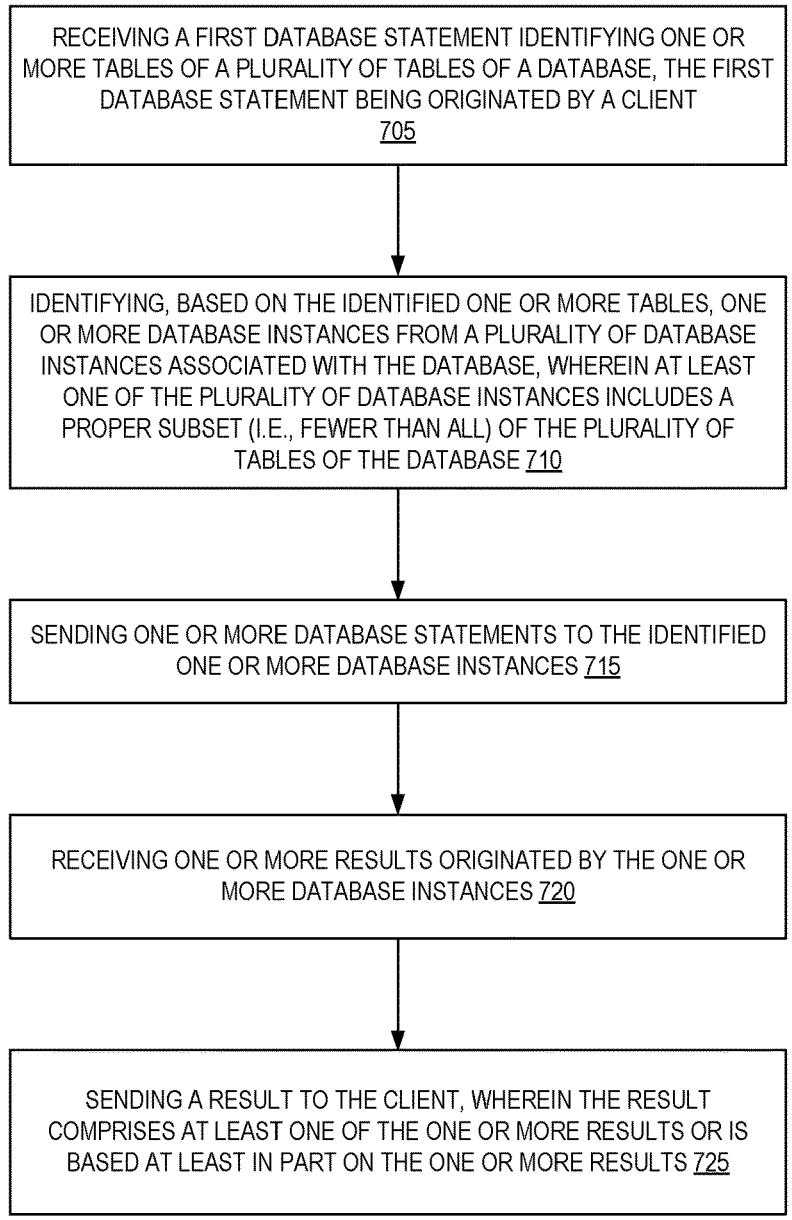
FIG. 7 is a flow diagram illustrating operations of a method for transparent database table partitioning using proxy-based query rewriting according to some embodiments.

FIG. 7 is a flow diagram illustrating operations 700 of a method for transparent database table partitioning using proxy-based query rewriting according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by the database proxy instance 120 or DCMGS 150 of the other figures.

The operations 700 include, at block 705, receiving a first database statement identifying one or more tables of a plurality of tables of a database, the first database statement being originated by a client; at block 710, identifying, based on the identified one or more tables, one or more database instances from a plurality of database instances associated with the database, wherein at least one of the plurality of database instances includes a proper subset of the plurality of tables of the database; at block 715, sending one or more database statements to the identified one or more database instances; at block 720, receiving one or more results originated by the one or more database instances; and at block 725, sending a result to the client, wherein the result comprises at least one of the one or more results or is based at least in part on the one or more results.

In some embodiments, the one or more database instances includes a first database instance and a second database instance; the one or more database statements includes a second database statement and a third database statement, wherein the second database statement and the third database statement are different; and sending the one or more database statements includes sending the second database statement to the first database instance and sending the third database statement to the second database instance. In some embodiments, the first database statement identifies a first table and a second table; the first database instance implements the first table but not the second table; and the second database instance implements the second table but not the first table. In some embodiments, the first database statement includes a JOIN clause; the second database statement does not include any JOIN clause; and the third database statement does not include any JOIN clause. In some embodiments, the operations further include generating the second database statement based on the first database statement, wherein the second database statement is different than the first database statement. In some embodiments, receiving one or more results originated by the one or more database instances comprises receiving a second result from the first database instance, and wherein the operations further comprise: generating the third database statement based on the first database statement and further based on the second result. In some embodiments, receiving one or more results originated by the one or more database instances further comprises receiving a third result from the second database instance; and the result sent to the client comprises the third result. In some embodiments, receiving one or more results originated by the one or more database instances further comprises receiving a third result from the second database instance, and wherein the operations further comprise: generating the result based at least in part on the second result and the third result.

The first database statement, in some embodiments, identifies a table of the database; and the one or more database instances includes a first database instance that hosts a first table and a second database instance that hosts a second table, wherein the first table stores a first plurality of rows and the second table stores a second plurality of rows, wherein the first plurality of rows are different than the second plurality of rows, and wherein the first plurality of rows and the second plurality of rows collectively represent a plurality of rows for the table of the database.

The operations 700 optionally include, in some embodiments, sending the first database statement to a test database instance to be executed; receiving a result from the test database instance; and determining, prior to sending the one or more database statements, that the first database statement was executed successfully by the test database instance based on the result.

In some embodiments, the first database statement identifies a first table and a second table, and wherein the operations further comprise: determining that the first table and the second table are both hosted by a first database instance, wherein sending the one or more database statements to the identified one or more database instances includes sending the first database statement to the first database instance.

Sending one or more database statements to the identified one or more database instances, in some embodiments, comprises sending a first database statement to a first database instance and sending a second database statement to a second database instance; receiving one or more results originated by the one or more database instances comprises receiving a first result from the first database instance and receiving a second result from the second database instance; and the operations further comprise: storing data returned within the first result or the second result in a test database instance; and generating the result for the client based at least in part on querying the test database instance.

The operations 700 optionally include, in some embodiments, receiving a command to migrate the database; determining, based on characteristics of the database, that a first of the one or more tables should be hosted by itself; causing a first of the one or more database instances to be configured with the first table; and causing a second of the one or more database instances to be configured with at least a second table of the one or more tables.

Figure 8:
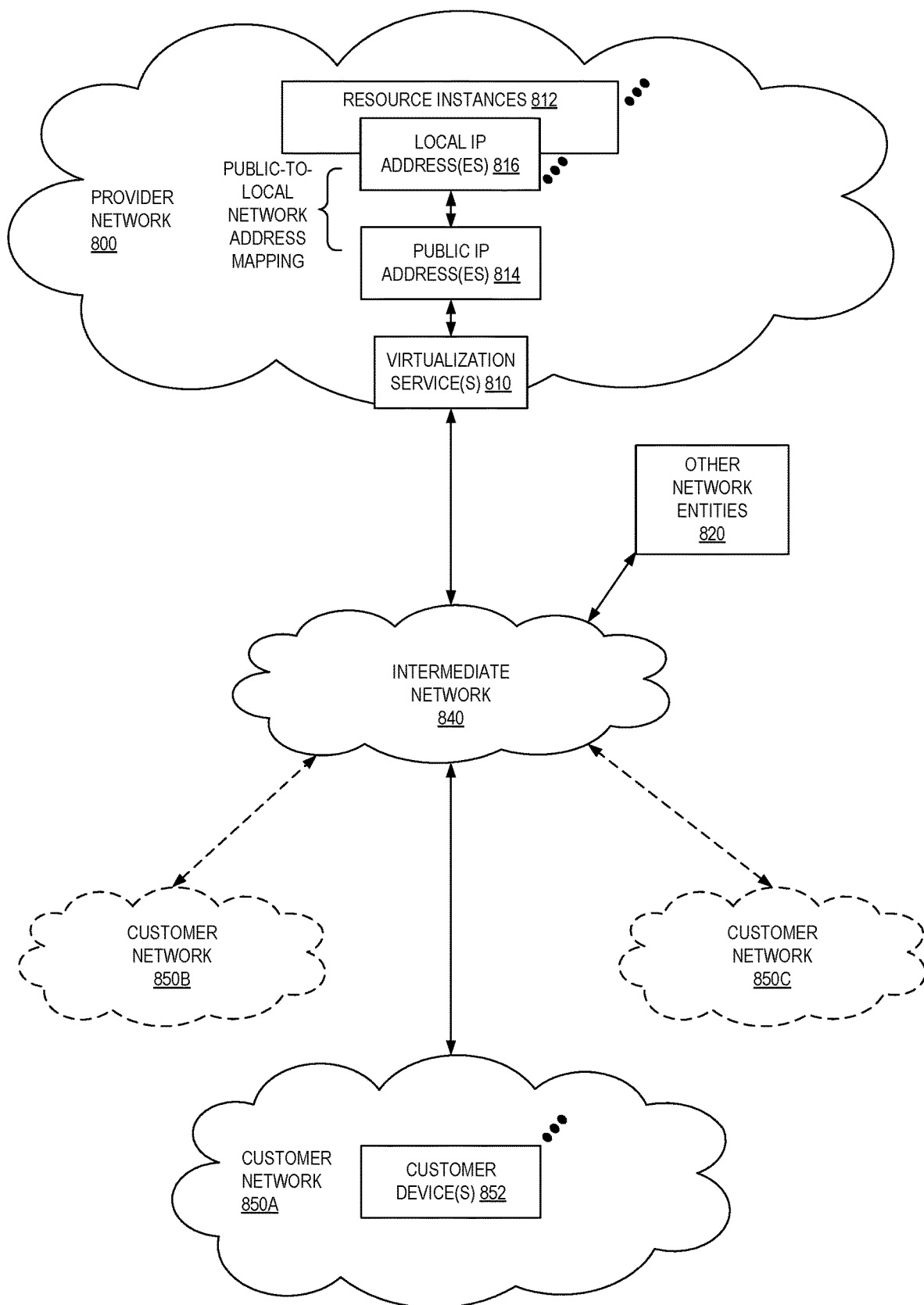
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
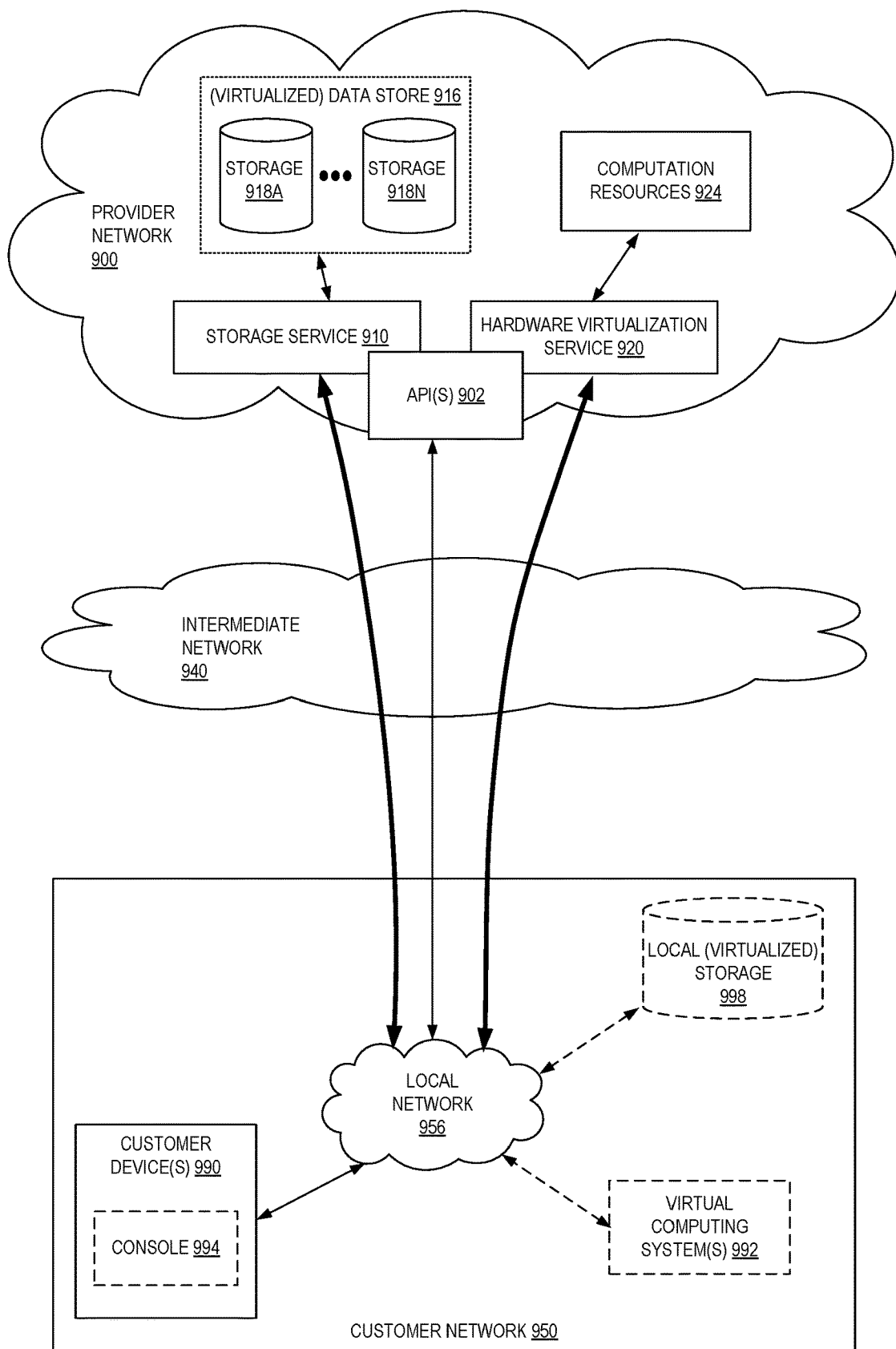
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
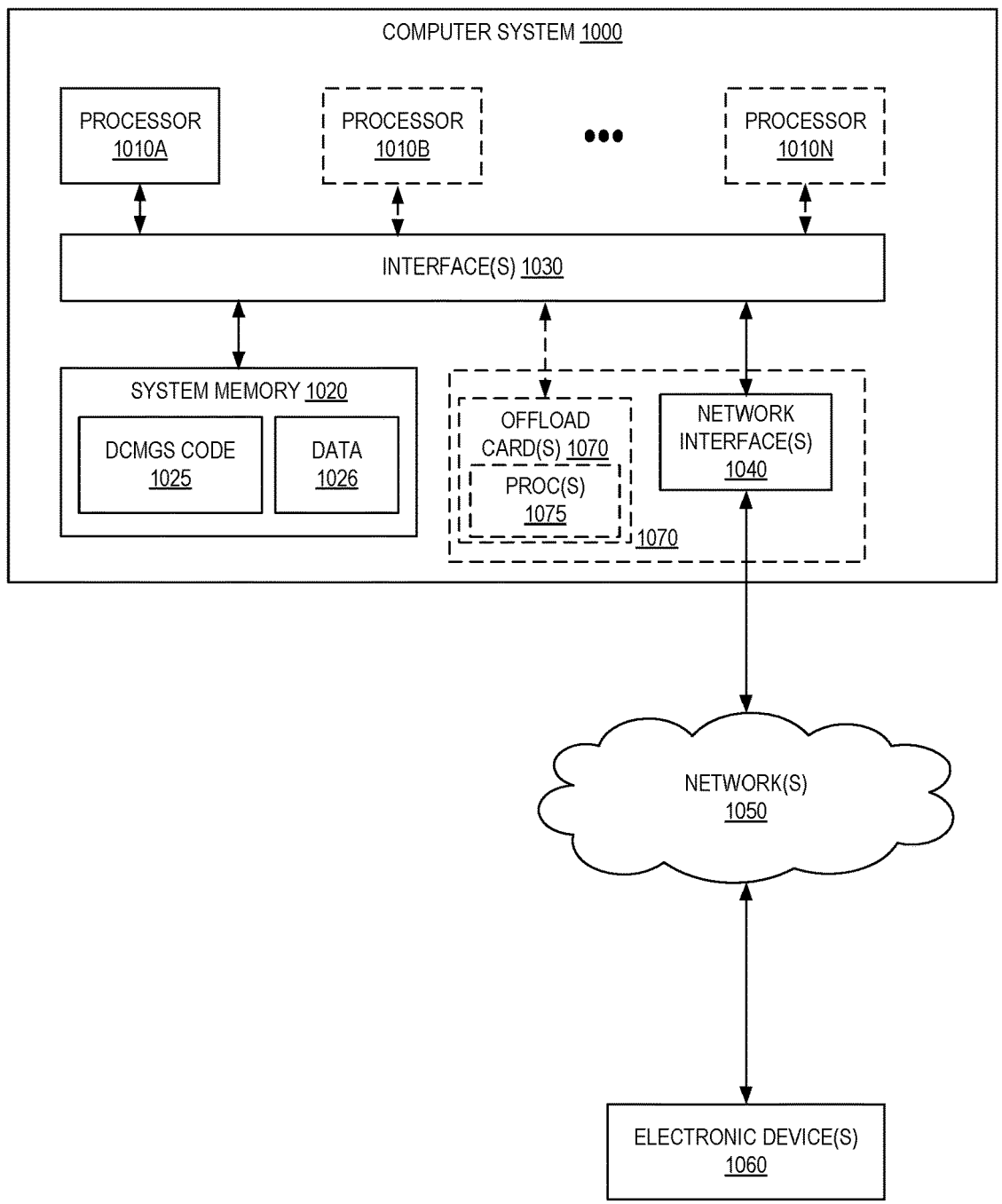
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as DCMGS code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    causing a set of one or more database statements, each comprising a join between a first table and a second table, to be executed against the first table and the second table of a first database instance, the first database instance comprising a first database engine configured to execute database statements against the first table and the second table of the first database instance;
    hosting the second table in a second database instance, the second database instance comprising a second database engine configured to execute database statements against the second table of the second database instance;
    receiving, at a database proxy instance executed within a multi-tenant provider network, a database statement sent over a client connection with a client application, the database statement comprising a query that includes a JOIN of the first table and the second table;
    generating, by the database proxy instance, a first custom database statement based at least in part on the database statement;
    causing, by the database proxy instance, the first custom database statement to be executed against the first table of the first database instance;
    receiving, at the database proxy instance, a first result for the first custom database statement;
    generating, by the database proxy instance, a second custom database statement based at least in part on the first result;
    causing, by the database proxy instance, the second custom database statement to be executed against the second table of the second database instance;
    receiving, at the database proxy instance, a second result for the second custom database statement;
    generating, by the database proxy instance, a result for the database statement based at least in part on the first result for the first custom database statement and the second result for the second custom database statement; and
    returning the result from the database proxy instance to the client application via the client connection.

2. The computer-implemented method of claim 1, wherein:
    the join between the first table and the second table is specified by a join predicate of the database statement, the join predicate identifies a foreign key column of the first table and a primary key column of the second table,
    the first custom database statement selects values from the foreign key column of the first table,
    the second custom database statement selects values from the primary key column of the second table,
    the first result for the first custom database statement comprises a first set of records, the first set of records comprising a first set of values from the foreign key column of the first table of the first database instance,
    the second result for the second custom database statement comprises a second set of records, the second set of records comprising a second set of values from the primary key column of the second table of the second database instance, and
    the method further comprises generating the result for the database statement based at least in part on combining the first set of records and the second set of records according to matches between the first set of values and the second set of values.

3. The computer-implemented method of claim 1, wherein:
    the first result for the first custom database statement comprises a set of records, the set of records comprising a set of values of the first table of the first database instance, and
    the method further comprises generating the second custom database statement based at least in part on one or more values of the set of values of the set of records of the first result.

4. A computer-implemented method comprising:
    causing a set of database statements, each comprising a join between a first table and a second table, to be executed against the first table and the second table of a first database instance;
    hosting the second table in a second database instance;
    receiving a database statement comprising a join between the first table and the second table;
    generating a first custom database statement based at least in part on the database statement;
    causing the first custom database statement to be executed against the first table of the first database instance;
    receiving a first result for the first custom database statement;
    generating a second custom database statement based at least in part on the first result;
    causing the second custom database statement to be executed against the second table of the second database instance;
    receiving a second result for the second custom database statement;
    generating a result for database statement based at least in part on the first result for the first custom database statement and the second result for the second custom database statement; and
    returning the result.

5. The computer-implemented method of claim 4, further comprising determining to host the second table in the second database instance based at least in part on determining that the second table of the first database instance exceeds a threshold size.

6. The computer-implemented method of claim 4, further comprising determining to host the second table in the second database instance based at least in part on determining that a size of the second table of the first database instance is greater than a predetermined percentage of memory of the first database instance.

7. The computer-implemented method of claim 4, further comprising determining to host the second table in the second database instance based at least in part on determining that a growth rate of the second table of the first database instance exceeds a growth rate threshold.

8. The computer-implemented method of claim 4, wherein the first database instance and the second database instance are located on different electronic devices.

9. The computer-implemented method of claim 4, wherein:
the join between the first table and the second table is specified by a join predicate of the database statement;
the join predicate identifies a foreign key column of the first table and a primary key column of the second table;
the first custom database statement selects values from the foreign key column of the first table;
the second custom database statement selects values from the primary key column of the second table;
the first result for the first custom database statement comprises a first set of records, the first set of records comprising a first set of values from the foreign key column of the first table of the first database instance;
the second result for the second custom database statement comprises a second set of records, the second set of records comprising a second set of values from the primary key column of the second table of the second database instance; and
the method further comprises generating the result for the database statement based at least in part on combining the first set of records and the second set of records according to matches between the first set of values and the second set of values.

10. The computer-implemented method of claim 4, further comprising determining to generate the first custom database statement based at least in part on determining that the first table and the second table are hosted in different database instances.

11. The computer-implemented method of claim 4, wherein the database statement is received at a database proxy from a client and the result of database statement is returned to the client from the database proxy.

12. The computer-implemented method of claim 4, wherein the second table in the second database instance is a read-only replica of the second table of the first database instance.

13. The computer-implemented method of claim 4, wherein:
the first result for the first custom database statement comprises a set of records, the set of records comprising a set of values of the first table of the first database instance, and
the method further comprises generating the second custom database statement based at least in part on one or more values of the set of values of the set of records of the first result.

14. The computer-implemented method of claim 4, wherein the join of the database statement is an inner join.

15. The computer-implemented method of claim 4, further comprising determining to host the second table in the second database instance based at least in part on a result of analyzing one or more query logs of the first database instance, the result comprising a count of queries involving a join between the first table and the second table of the first database instance exceeding a threshold.

16. The computer-implemented method of claim 4, wherein the first database instance and the second database instance are located on the same electronic device.

17. A system comprising:
a first one or more electronic devices to implement a plurality of database instances, wherein a first database instance of the plurality of database instances is to comprise a first database engine configured to execute database statements against a first table of the first database instance, and wherein a second database instance of the plurality of database instances is to comprise a second database engine configured to execute database statements against a second table of the second database instance; and
a second one or more electronic devices to implement a database proxy instance, the database proxy instance including instructions that upon execution cause the database proxy instance to:
receive a database statement that comprises a join between the first table and the second table;
generate a first custom database statement based at least in part on the database statement;
cause the first custom database statement to be executed against the first table of the first database instance;
receive a first result for the first custom database statement from the first database instance;
generate a second custom database statement based at least in part on the first result;
cause the second custom database statement to be executed against the second table of the second database instance;
receive a second result for the second custom database statement from the second database instance;
generate a result for database statement based at least in part on first result for the first custom database statement and the second result for the second custom database statement; and
return the result from the database proxy instance.

18. The system of claim 17, wherein:
the join between the first table and the second table is to be specified by a join predicate of the database statement,
the join predicate is to identify a foreign key column of the first table and a primary key column of the second table,
the first custom database statement is to select values from the foreign key column of the first table,
the second custom database statement is to select values from the primary key column of the second table,
the first result for the first custom database statement is to comprise a first set of records, the first set of records is to comprise a first set of values from the foreign key column of the first table of the first database instance,
the second result for the second custom database statement is to comprise a second set of records, the second set of records is to comprise a second set of values from the primary key column of the second table of the second database instance, and
the instructions upon execution are to cause the database proxy instance to generate the result for the database statement based at least in part on combining the first set of records and the second set of records according to matches between the first set of values and the second set of values.

19. The system of claim 17, wherein:
the first result for the first custom database statement is to comprise a set of records, the set of records is to comprise a set of values of the first table of the first database instance, and
the instructions upon execution are to cause the database proxy instance to generate the second custom database statement based at least in part on one or more values of the set of values of the set of records of the first result.

20. The system of claim 17, wherein:
the one or more first electronic devices comprise a plurality of electronic devices; and
the first database instance and the second database instance are to be located on different electronic devices of the plurality of electronic devices.

* * * * *